United States Patent [19]
Li et al.

[11] Patent Number: 5,718,801
[45] Date of Patent: Feb. 17, 1998

[54] METHOD FOR CONTROLLING FROTH AND REDUCING STICKIES IN THE FLOTATION PROCESS FOR DEINKING WASTE PAPER USING A FROTH MODERATING AGENT

[75] Inventors: Chin Li, Murrysville; David A. Longhini, Pittsburgh; Bhima R. Vijayendran, Monroeville, all of Pa.

[73] Assignee: PPG Industries, Inc., Pittsburgh, Pa.

[21] Appl. No.: 289,072

[22] Filed: Aug. 11, 1994

[51] Int. Cl.$^6$ .................................. D21C 5/02
[52] U.S. Cl. .................. 162/5; 162/4; 162/DIG. 3
[58] Field of Search ................. 162/4, 5, DIG. 3; 252/61, 174.22, 358, DIG. 1, 162; 209/166

[56] References Cited

U.S. PATENT DOCUMENTS

| | | | |
|---|---|---|---|
| 3,061,552 | 10/1962 | Schenck et al. | 252/135 |
| 4,309,282 | 1/1982 | Smith, Jr. et al. | 209/166 |
| 4,376,011 | 3/1983 | Menschhorn et al. | 162/5 |
| 4,518,459 | 5/1985 | Freis et al. | 162/5 |
| 4,690,713 | 9/1987 | Terae et al. | 106/187.16 |
| 4,964,949 | 10/1990 | Hamaguchi et al. | 162/5 |
| 4,971,656 | 11/1990 | Lehmann et al. | 162/5 |
| 5,102,500 | 4/1992 | Darlington | 162/5 |
| 5,120,397 | 6/1992 | Urushibata et al. | 162/5 |
| 5,141,598 | 8/1992 | Richman et al. | 162/5 |
| 5,228,953 | 7/1993 | Bast et al. | 162/5 |
| 5,248,388 | 9/1993 | Richmann et al. | 162/5 |
| 5,283,002 | 2/1994 | Nguyen | 252/321 |
| 5,295,584 | 3/1994 | Krause et al. | 209/166 |
| 5,304,316 | 4/1994 | Urushibata et al. | 252/60 |

FOREIGN PATENT DOCUMENTS

WO 90/04674  5/1990  WIPO.

OTHER PUBLICATIONS

"The Polyglycol Handbook" published by Dow Chemical, 1988, p. 7.

*Encyclopedia of Polymer Science and Technology*, vol. 2, 1965, John Wiley & Sons, Inc. pp. 164–171.

*Surface Active Agents, Their Chemistry and Technology*, by A. M. Schwarz & J. W. Perry, Interscience Publishers, Inc., 1949, p. 109.

"Triton Surface–Active Agents", Rohm & Haas Co., 1981, p. 23.

*Primary Examiner*—Donald E. Czaja
*Assistant Examiner*—Dean T. Nguyen
*Attorney, Agent, or Firm*—Frank P. Mallak; Irwin M. Stein

[57] ABSTRACT

Describes flotation deinking of secondary fiber using a froth moderating agent, a composition of the froth moderating agent with flotation deinking chemicals, and reducing the amount of stickies in separated secondary fiber. The froth moderating agent is selected from the group consisting of:

(a) nonionic surfactant material represented by the formula:

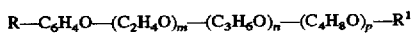

$$R-C_6H_4O-(C_2H_4O)_m-(C_3H_6O)_n-(C_4H_8O)_p-R^1$$

wherein R is an aliphatic hydrocarbon group containing from about 5 to 20 carbon atoms, $R^1$ is selected from the group consisting of chloro, $C_1$–$C_3$ alkyl, $C_1$–$C_5$ alkoxy and phenoxy, m, n, and p are each a number of between 0 and about 50, and the sum of m, n, and p is between about 1 and 50;

(b) fatty acid esters of sorbitan;

(c) certain alkoxylated fatty acid esters of sorbitan;

(d) polypropylene glycol being at least 50 weight percent soluble in water; and (e) a combination of at least two of the materials selected from the group consisting of (a), (b), (c) and (d).

Also described is the use of a froth controlling amount of nonionic surfactant material (a) alone or in combination with flotation deinking chemicals or other froth moderating agents in reducing the amount of stickies and enhancing the removal of electrostatic inks in the flotation deinking process.

15 Claims, No Drawings

METHOD FOR CONTROLLING FROTH AND REDUCING STICKIES IN THE FLOTATION PROCESS FOR DEINKING WASTE PAPER USING A FROTH MODERATING AGENT

DESCRIPTION OF THE INVENTION

The present invention relates to the flotation process for removal of ink from printed waste paper in the course of reclaiming the fiber content of the waste paper for reuse in the manufacture of new paper. More particularly, the present invention relates to controlling the froth level and reducing the carry-over of stickies in flotation deinking systems. Still more particularly, the invention relates to novel froth moderating agents, a composition of froth moderating agent and flotation chemicals, and a method for controlling the amount of froth in and reducing the carry-over of stickies from flotation cells used in flotation deinking systems.

Paper manufacture, as at present practiced, does not damage or alter the character of the essential fiber from which the paper is originally made. Hence, such fiber may be recovered from used paper and reused in the manufacture of fresh paper stock. This recovered fiber is typically referred to as secondary fiber. A limitation to the practical recovery of and reuse of secondary fiber from printed waste paper is the difficulty and consequent expense of thoroughly deinking the printed paper.

Secondary fiber from printed waste paper has been utilized in the past for the production mainly of low grade paper and paperboard products. Today, however, due to the ever increasing world-wide scarcity in wood supply and continuously increasing energy costs, upgrading and reusing of secondary fiber has obtained greater economic and environmental importance. An increase in the use of secondary fiber is highly dependent on the quality of the reclaimed fiber, more particularly the degree of brightness possessed by the reclaimed secondary fiber and the substantial absence of visible ink particles in paper products prepared from the secondary fiber.

There are currently two principal processes for deinking paper; namely, washing and flotation. In both processes, the waste paper to be salvaged may be first cleansed of superficial dirt and shredded. The shredding operation may be conveniently performed in a hammer mill or paper shredder. Alternatively, the waste paper may be charged directly to the vessel, e.g., pulper, containing heated water, alkali reagents, such as sodium hydroxide, and an agitator, as hereinafter described. Thereafter, the waste paper (whether or not shredded) is converted to a pulp slurry in an aqueous alkali bath with strong agitation and frequently at elevated temperatures, e.g., between 75° F. (23.9° C.) and 175° F. (79.4° C.). This process results in the defiberization of the paper and facilitates separation of the ink from the paper fibers and filler, e.g., clay, in the paper. Thereafter, the ink particles are separated from the fibers by the washing or flotation process, or a combination of the two processes.

Deinking of printed paper by the flotation process is entirely different from deinking by the washing process. The washing process requires exactly the opposite conditions than that required for the flotation process, vis-à-vis, the size and the hydrophilic or hydrophobic nature of the ink particles to be separated. The hydrophilic or hydrophobic nature of the ink particle can be effected by the type of chemical adsorbed onto the surface of the ink particle. The washing process requires well dispersed hydrophilic ink particles in order to obtain efficient removal of the ink. Certain surface active agents or surfactants perform that dispersive function, thereby facilitating separation of the ink particles, together with dirt, from the fibers by washing.

The flotation process, on the other hand, involves attachment of hydrophobic ink particles onto air bubbles and ink removal by a flotation step. Chemicals used in the flotation deinking process may include: collector chemicals that adsorb onto the surface of the ink particle and cause the ink particles to attach to air bubbles and float; frothing agents that ensure stability of the air bubbles; displectors that perform the function of dispersive surfactants and collector chemicals in a single compound or formulation; and chemical deinking agents that facilitate the separation of the ink particles from the fibers. Since certain surfactants can be strong dispersion reagents, their presence in the paper pulp is controlled in the flotation process to limit the dispersion of the ink particles. Therefore, the two processes are not comparable with each other in respect to the ink separation method or the mode of action of the chemicals used.

In the flotation process, which utilizes the difference in wettability between printing inks and paper fibers, air is forced or drawn through a suspension of fiber and ink particles in the presence of flotation deinking chemicals. Printing ink particles attach themselves to the air bubbles and form a froth at the surface of the suspension, which is then removed by, for example, skimming or decantation and collected. The ink particles contained in the froth are subsequently separated from the water component of the collected froth. The deinked pulp recovered by the flotation process may then be treated further, e.g., filtered, washed, and possibly bleached to form a paper stock for use in the preparation of new paper products.

The deinking and reclamation of secondary fiber by the aforedescribed processes has in the past been reasonably satisfactory because the source of the waste paper used in the deinking process has been reasonably uniform, and the recovered secondary fiber has been used principally in packaging materials or in applications not requiring a high degree of optical brightness. However, with the progressive depletion of natural wood resources and the ever increasing public demand to recycle paper, the type of waste paper processed by the aforesaid deinking processes has become more and more varied, and the paper deinked is generally a mixture of different types of waste paper printed with a variety of ink formulations. Such waste paper may also contain adhesive contaminants.

Adhesive contaminants that are often found in waste paper include pressure sensitive, e.g., acrylic contact adhesives, and/or polyester hotmelt adhesive tapes, seam bindings, labels, decals, stamps, and stickers, e.g., bumper sticker. These adhesives are referred to as "stickies" in the papermaking art. Stickies are a diverse mixture of synthetic polymeric organic materials. During the pulping process, stickies are liberated from secondary fiber due to the applied mechanical and thermal energy. Stickies do not disperse well in water and if carried-over with the recovered fiber, will either end up as "dirt spots" on the paper sheets or stick onto the wires, felts or other paper making equipment which commonly requires the shutting down of such equipment in order to remove the stickies by solvent washing techniques. Other chemical and non-chemical methods for removing or reducing stickie contamination are described in U.S. Pat. No. 5,139,616 at column 1, line 61 to column 2, line 15, the disclosure of which methods is herein incorporated by reference.

Ink formulations used in the printing industry have become more and more complex and involve increasingly the use of a wide variety of synthetic resins and polymers.

Further, increasing amounts of xerographic copy paper are being used each year, and larger and larger amounts of impact and non-impact (ink jet and laser printed computer paper) are being recycled. Such paper, together with newsprint and magazines, make up the principal sources for recycled waste paper. Furthermore, multicolored printing and multicolored advertisements have become increasingly important in recent years and these advertisements use a wide variety of new ink formulations, many of which incorporate atypical pigments, dyes and toners.

A variety of chemical deinking agents are known to be useful in facilitating the separation of ink particles from secondary fibers and reducing stickies. Examples of deinking agents described in the literature that may be used in the flotation process include anionic surface active agents, such as alkyl benzene sulfonates, higher alkylsulfate ester salts, α-olefin sulfonates and dialkylsulfosuccinates; and nonionic surface active agents such as ethylene oxide adducts of higher alcohols, alkylphenols, fatty acids and alkanolamides. Such deinking agents may be used either by themselves or in combination with one another. U.S. Pat. No. 5,139,616 discloses a method for reducing stickies which comprises adding to the pulp slurry at least one surfactant selected from the group consisting of fatty alkanolamides and ethoxylated compounds in addition to a hydrocarbon solvent.

U.S. Pat. No. 4,376,011 describes a composition consisting of fatty acid esters of mono- or polyhydric alcohols for use in the flotation process for removing pigments from waste paper. U.S. Pat. No. 4,964,949 describes a deinking composition for reclamation of waste paper comprising an alkylene oxide adduct of a mixture of a natural oil or fat and a polyhydric alcohol, and an alkylene oxide adduct of a higher alcohol, a sulfate of the higher alcohol alkoxylate or a higher fatty acid. U.S. Pat. No. 4,971,656 describes a flotation process for deinking printed waste paper in which the waste paper is treated in a pulper with a treating solution prepared by adding to an aqueous alkaline solution an alkali-metal silicate, an oxidative bleaching agent, and an aqueous collector selected from the group consisting of an aqueous solution of an alkali metal salt of a protein fatty acid condensate, an aqueous solution of an amine salt of a protein fatty acid condensate, an aqueous dispersion of alkaline earth metal salt of a protein fatty acid condensate, or mixtures thereof.

U.S. Pat. No. 5,120,397 describes a deinking composition which is the reaction product obtained by reacting a natural oil or fat, or a reaction product of a natural oil or fat with glycerin, with a hexahydric alcohol to obtain an ester mixture and subsequently reacting the ester mixture with ethylene oxide and propylene oxide. U.S. Pat. No. 5,228,953 describes an additive comprising a polyglycol and a complex mixture of esters formed from $C_1$–$C_{20}$ alcohols esterified with phosphoric acid for flotation deinking of waste paper. U.S. Pat. No. 5,304,316 describes a deinking agent obtained by reacting an ethoxylated and propoxylated fatty acid or an ethoxylated and propoxylated incomplete ester of a polyhydric alcohol with a dicarboxylic acid or an anhydride thereof. International Patent Application WO90/04674 describes the use of amphoteric surfactants in flotation deinking of laser printed waste paper.

The use of sorbitan esters and sorbitan ester ethoxylates for the deinking of electrostatic printed paper is disclosed in U.S. Pat. No. 5,248,388. These sorbitan esters are included in a group of surfactants having a hydrophile-lipophile (HLB) number less than 10. It is stated that the use of these surfactants enables the separation of electrostatic toner particles from fiber by centrifugal cleaning and/or screening. This ink separation step is significantly different than the flotation process addressed by the present invention.

Sorbitan esters and sorbitan ester ethoxylates have been used as defoaming agents and as antifoaming agents in processes other than deinking processes. For example, they have been used in processes for refining sugar and producing yeast. In the same context, polypropylene glycols that are more oil soluble than water soluble are also described as defoaming agents and as antifoaming agents in *The Polyglycol Handbook* published by the Dow Chemical Company, page 7.

Defoaming agents are materials that reduce the amount of foam, whereas antifoaming agents are materials that prevent the formation of foam. It is recognized that the defoaming art is highly unpredictable and that a material that acts as an antifoam for one system may be a foamer in another. See the publication, *Encyclopedia of Polymer Science and Technology*, John Wiley and Sons, Inc., 1965, Volume 2, page 164. Hence, whether a material functions as a defoamer, an antifoamer, or functions as a defoamer at all depends on the system in which is it is used, i.e., whether a material functions as a defoamer is system dependent.

The flotation deinking process requires careful control of the level and amount of froth in the flotation cell since the froth level and amount effect the amount of fiber recovered and the quality, i.e., brightness, dirt count, and the amount of stickies, of the paper produced from such fiber. If the amount of froth, typically measured as a level or height above the surface of the liquid, produced in the flotation cell is too high, it overflows the flotation cell into the collection area and carries with it secondary fiber, which is rejected or separated with the ink particles and is consequently lost. If the amount of froth is too low, ink particles within the froth are not removed from the paper pulp, which results in paper, produced from such pulp, having less brightness and containing an unacceptable number of ink spots, which is undesirable for high grade paper, vis-a-vis, low grade and paperboard products. Also, if the amount of froth in the collection area becomes too high, it will prevent further processing of froth and may interrupt the entire flotation deinking process. In some circumstances, in which froth overflows the flotation chemical mix tank or the containment walls of the flotation tank, imbalances in the internal water recycle system within the deinking plant may occur.

The use of antifoaming or defoaming agents in the flotation cell prevent or may reduce, respectively, the amount of froth required for ink separation in the flotation process. The use of mechanical or chemical defoaming means in the collection area does not address the potential loss of fiber due to carryover by high levels of froth in the flotation process.

In addition to the type and amount of the chemical deinking materials used to accomplish deinking, which may vary with the type of ink found in the waste paper, other factors that can cause fluctuations in the amount of froth produced in flotation deinking systems include the hardness of the water used to prepare the pulp slurry, the pH of the slurry, the nature of the ink formulation comprising the ink particles, which varies with the source of waste paper, the amount and type of coating, sizing, and fillers, e.g., clay and calcium carbonate, used in the paper deinked, the size of air bubbles, and the consistency and temperature of the pulp slurry as well as the velocity and flow conditions in the flotation cell.

The use of mixtures of waste paper from different categories, e.g., newsprint, office, computer printout, etc., in a flotation deinking process can contribute to significant fluctuations in the level of froth formed during flotation deinking because of the variation in printing inks, coating chemicals, and fillers that are used in those different types of paper, and the varying type and amount of deinking chemicals used to deink such wastepapers. It is not economically feasible to limit a deinking process to a specific category of waste paper in view of the current industry practices in collecting diverse categories of waste paper, e.g., newspapers, computer print outs and mixed office waste paper. Therefore, there is a need for a treatment that can control the amount of froth in the froth flotation and froth collection steps without causing a loss of fiber or a decrease in the brightness of the paper produced from such fiber.

It has now been discovered that the amount of froth in the flotation process, e.g., in the flotation cell and in the froth collection area, can be controlled, yielding the benefit of increased fiber recovery and improved brightness of paper formed from such fiber, by adding to the paper pulp a froth controlling amount of a froth moderating agent selected from the group consisting of:

(a) nonionic surfactant material represented by the formula:

$$R-C_6H_4O-(C_2H_4O)_m-(C_3H_6O)_n-(C_4H_8O)_p-R^1$$

wherein R represents aliphatic hydrocarbon group(s), typically a saturated hydrocarbon, each containing from about 5 to 20 carbon atoms, $R^1$ is selected from the group consisting of chloro, $C_1-C_3$ alkyl, $C_1-C_5$ alkoxy, and phenoxy, m, n, and p are each a number of between 0 and about 50, and the sum of m, n, and p is between about 1 and 50;

(b) fatty acid esters of sorbitan;

(c) certain alkoxylated fatty acid esters of sorbitan;

(d) polypropylene glycols that are at least 50 weight percent soluble in water under the conditions of use; and (e) a combination of at least two of the aforesaid materials (a), (b), (c), and (d);

or by adding a composition comprising a combination of flotation deinking chemicals with the froth moderating agents (a), (b), (c), (d), or (e). It has also been discovered that the use of a froth controlling amount of nonionic surfactant material (a) alone or in combination with flotation deinking chemicals or other froth moderating agents reduces the amount of stickies in the separated fiber and enhances the removal of electrostatic inks in a flotation deinking process.

DETAILED DESCRIPTION OF THE INVENTION

In accordance with the present invention, a froth controlling amount, i.e., an amount necessary to control the amount of froth to a desired level in a flotation deinking system, of froth moderating agent or a composition of froth moderating agent and flotation deinking chemical(s) is provided in an aqueous suspension of pulp fibers and ink particles, e.g., in the flotation cells, to avoid excessive fluctuations in the level of foam produced during separation of ink particles from pulp fibers in a flotation deinking process.

More particularly, in the method of deinking secondary fiber wherein an aqueous slurry of secondary fiber is produced from waste paper, the aqueous slurry of secondary fiber is treated with chemical deinking agents, thereby to form an aqueous slurry comprising ink particulates and secondary fiber, and the ink particulates are separated from the secondary fiber by a process that includes a flotation step, the present invention contemplates performing the ink separating flotation step in the presence of a froth controlling amount of a froth moderating agent.

Nonionic froth moderating agent(s) that may be used in the process of the present invention include materials that may be represented by the following formula I:

$$R-C_6H_4O-(C_2H_4O)_m-(C_3H_6O)_n-(C_4H_8O)_p-R^1 \qquad I$$

wherein R represents a linear or branched aliphatic hydrocarbon group(s), typically a saturated hydrocarbon group, and preferably is a hydrocarbon group containing from about 5 to 20 carbon atoms; more preferably, the hydrocarbon group, R, contains from about 8 to 10 carbon atoms; $-C_6H_4O-$ represents the bivalent phenyleneoxy group; $-(C_2H_4O)_m-$ represents a poly(ethylene oxide) group; $-(C_3H_6O)_n-$ represents a poly(propylene oxide) group; and $-(C_4H_8O)_p-$ represents a poly(butylene oxide) group. R typically represents a single hydrocarbon group attached to the bivalent phenyleneoxy group, however, two or three R groups may be attached to the aromatic moiety of the phenyleneoxy group. The poly(ethylene oxide), poly (propylene oxide), and poly(butylene oxide) groups in the material of formulation I may be ordered or may be random, i.e., the poly(ethylene oxide) group, the poly(propylene oxide) group, and the poly(butylene oxide) groups may be in a random or block order within the molecule.

$R^1$ in formula I is selected from the group consisting of chloro, $C_1-C_3$ alkyl, $C_1-C_5$ alkoxy and phenoxy. Preferably, $R^1$ is chloro. The letters m, n, and p are each a number of between 0 and about 50, and the sum of m, n, and p is between about 1 and 50; more preferably, m, n, and p are each a number of between 0 and about 30, and the sum of m, n, and p is between about 1 and 30; most preferably, m, n, and p are each a number of between 0 and about 10, and the sum of m, n, and p is between about 1 and 10. Particularly preferred, are materials wherein p is zero (0) and wherein m and n are each a number of between 0 and about 30, and the sum of m and n is between about 1 and 30; more preferably, m and n are each a number of between 0 and about 10, and the sum of m and n is between about 1 and 10. Most preferably n and p are zero and m is a number of between 1 and about 10. The numbers for m, n, and p are average values and can be partial numbers, e.g., 9.5.

Procedures for the preparation of compounds of formula I having poly(ethylene oxide) and poly(propylene oxide) groups are disclosed in U.S. Patent No. 4,518,459, column 5 line 49 to column 8 line 25. The incorporation of poly (butylene oxide) groups can be accomplished by similar methods or other methods known in the art. The preparation of compounds having $C_1-C_3$ alkyl, $C_1-C_5$ alkoxy, or phenoxy as $R^1$ may be accomplished by use of the Williamson Synthesis, which is described in *The Merck Index*, Tenth edition, published by Merck & Co., Inc., 1983, page ONR-96. The preparation of compounds having a chloro group as $R^1$ is described in *Surface Active Agents*, by A. M. Schwarz and J. W. Perry, Interscience Publishers, Inc., 1949, page 109. Other methods for preparing the compounds having a chloro group as $R^1$ are described in the Triton Surface-Active Agents brochure published by ROHM and HAAS Co., 1981, page 23. The above citations and U.S. Pat. No. 4,518,459 are herein incorporated by reference.

Sorbitan fatty acid ester froth moderating agents may be derived from fatty acids of animal or vegetable origin. The lipophilic portion of the fatty acid may comprise alkyl-, alkenyl-, hydroxyalkyl- or hydroxyalkenyl- radicals containing from about 8 to 22 carbon atoms, preferably from about 12 to 18 carbon atoms. The carbon chain may be linear, branched, even or odd numbered. When the fatty acid is derived from natural animal or vegetable sources, the acids generally comprise a mixture of the aforementioned lipophilic radicals. For example, a distilled mixed vegetable oil fatty acid may have the following carbon-chain distribution: about 3 percent $C_{12}$-lauric fatty acid, about 10–12 percent $C_{14}$-myristic acid, about 15–20 percent $C_{16}$-palmitic acid, about 18–25 percent $C_{18}$-stearic acid, about 45–50 percent $C_{18}$-oleic acid and about 5 percent $C_{18}$-linoleic acid. Preferred are the sorbitan esters of oleic acid.

The fatty acid esters of sorbitan may comprise the monoesters, diesters, and triesters of sorbitan and mixtures of such esters. Preferred are the sorbitan monooleates and trioleates, which are commercially available as SPAN™ 80 and SPAN™ 85, and as S-MAZ® 80 and S-MAZ® 85, and the sorbitan monostearates and tristearates, which are commercially available as S-MAZ® 60 and S-MAZ® 65 respectively. Examples of other fatty acids that may be used to prepare the sorbitan esters include caprylic, capric, linolenic, tetradecanoic, hexadecanoic, tallow, and coconut fatty acids.

The alkoxylated sorbitan fatty acid ester froth moderating agents may be prepared by heating the aforedescribed sorbitan esters with the selected alkylene oxide(s); namely, those selected from ethylene oxide, propylene oxide and butylene oxide at 130° to 170° C. in the presence of alkaline catalyst, or by other methods known in the art. The sum of the number of individual ethyleneoxy propylenoxy and butylenoxy groups in the alkoxylated sorbitan fatty acid ester may be up to about 50. The total number of alkoxy groups may accordingly range from about 1 to about 50, e.g., 1 to 30, more particularly from 1 to 10. The preferred individual or combined alkoxy groups in the alkoxylated sorbitan fatty acid ester is selected from the group consisting of ethylenoxy and propylenoxy groups; ethylenoxy and butylenoxy groups; ethylenoxy, propylenoxy, and butylenoxy groups; propylenoxy groups; butylenoxy groups; and propylenoxy and butylenoxy groups; provided that the numerical ratio of ethylenoxy groups, when present, to the total number of the other alkylenoxy groups is less than 1, e.g., an alkoxylated sorbitan fatty acid ester having 4 ethylenoxy groups, 4 propylenoxy groups and 4 butylenoxy groups would have a ratio of 0.5. The alkoxylated sorbitan fatty acid ester froth moderating agents may have ordered or random poly(ethylene oxide), poly(propylene oxide) and poly(butylene oxide) groups and the number of individual groups may be a partial number in the same manner as described for the compounds represented by formula I. This material is hereinafter described as alkoxylated fatty acid esters of sorbitan.

Polypropylene glycol froth moderating agents include polypropylene glycols that are more water soluble than oil soluble under the conditions of use, i.e., more than 50 weight percent of the material (based on the total weight of the polypropylene glycol added to water) is soluble in water. It was an unexpected discovery that polypropylene glycols that are more water soluble than oil soluble performed as effective froth moderating agents. The water solubility of polypropylene glycol is dependent on its molecular weight, its concentration in the flotation cell and the temperature of use. For example, polypropylene glycol having a number average molecular weight of 425 is completely soluble in water when used at a concentration of less than 5 weight percent at temperatures up to 150° F. (65° C.), and polypropylene glycol having a number average molecular weight of 1200 is completely soluble in water when used at a concentration of 5 weight percent at temperatures up to about 50° F. (10° C.).

The amount of froth moderating agent(s) used to control the amount of froth in the flotation cell and in the froth collection area is a froth controlling amount. Such amounts typically range from about 0.005 to about 5 weight percent, and preferably from about 0.01 to about 3 weight percent, based on the weight of the dry pulp fiber.

It is contemplated herein further that the froth moderating agent(s) may be used in combination with flotation deinking chemicals as a composition for use in the flotation deinking process. In such a composition, the weight ratio of flotation deinking chemical(s) to the froth moderating agent(s) ranges from about 100:1 to about 1:1, preferably from about 30:1 to about 1.5:1, and more preferably from about 20:1 to about 2:1, the total amount of such agent(s) and chemicals being equal to 100 percent of the composition.

The amount of froth that is typically acceptable in flotation deinking systems is that amount which can be collected by skimming, decanting or other means, and which transports with it most or all of the separated ink particles and little or no amount of paper fibers. Clearly, an amount of froth that overflows equipment used in the flotation process, e.g., mixing tanks and flotation cells, is not acceptable. The amount of paper fiber that may be lost with the froth removed during the flotation deinking process may represent up to about 15 weight percent of the fiber present, based on the dry weight of the paper fiber. Preferably, the amount of fiber carried over with the froth is kept to a minimum. An excessive and unacceptable amount of lost paper fiber would be an amount in excess of above 15 weight percent. The amount or level of froth that is acceptable will depend on the type of flotation cell and auxiliary equipment used, and can be readily determined by those in the art who are skilled in operating such equipment. For example, in a Black Clawson flotation cell, an acceptable froth height is high enough above the surface of the liquid to overflow the collection baffle but lower than the height of the containment walls of the flotation tank.

The term flotation deinking chemicals as used herein includes collectors, frothing agents, displectors, and chemical deinking agents developed for the flotation process. Typical collector chemicals are potassium or sodium salts of fatty acids containing from 14 to 18 carbon atoms The most common fatty acids used are oleic and stearic acid. Various frothing agents that may be used in flotation deinking processes are disclosed in U.S. Pat. No. 4,376,011, column 2 lines 62 to 68, the disclosure of which is incorporated herein by reference. These frothing agents include cationic, anionic, or nonionic surfactants such as soaps, alkanesulfonates, alkylbenzene sulfonates, alkyl sulfates, sulfosuccinic acid esters, oxyethylated fatty acids and oxyethylated alkyl phenols, optionally in the form of the ether sulfates thereof.

Displector type products are reported to be nonionic surfactants based on either fatty alcohols or fatty acids which have been reacted with ethylene oxide and propylene oxide. Commercially available products include High Point DI 2000 sold by Kao Corporation, Berosel 204 sold by Berol Corporation, Lion Surf 729 sold by Lion Industries, Inc., and Floatsan™ 109 sold by PPG Industries, Inc. Various deinking chemicals for use in the flotation deinking process are described in the following U.S. Pat. Nos.: 4,971,656 at column 1, line 31 to column 2, line 8 and column 4, line 21 to column 6, line 3; 5,120,397 at column 2, lines 26 to 57; 5,228,953 at column 3, lines 23 to 46; and 5,304,316 at column 1, line 43 to column 6, line 58, the disclosures of which are incorporated herein by reference.

In the course of conventional waste paper reclamation to form a paper stock suitable for making paper on a paper machine, the waste paper is pulped by any conventional technique in a suitable defiberizing apparatus such as a Hollander beater, or a pulper such as the one sold by the Black Clawson Co., under the trademark HYDRAPULPER. The pulping, or repulping, as it is called, consists in reducing the dry waste paper to fibrous form, with enough water to aid processing. In the pulper, the waste paper is cooked, beaten and refined in an aqueous medium, usually an alkaline aqueous medium, at temperatures in the range of 75° F. (23.9° C.) to 175° F. (79.4° C.) to effect the defiberization of the paper and to facilitate separation of the ink particles from the paper fibers and filler, e.g., the clays, associated with the paper. Alkaline reagents commonly used in this step are sodium hydroxide (caustic soda), soda ash, a mixture of lime (calcium oxide) and soda ash, or a mixture of lime and sodium silicate.

The pH of the aqueous medium in which the pulp is treated will generally be between about 7.5 and 11.5, between about 8.5 and 10.5. Sufficient amounts of the alkaline reagents are used to produce the desired Generally, between about 0.5 and about 1 weight percent of sodium hydroxide, based on the dry pulp fiber, is sufficient to produce the desired pH. The consistency of the pulp in the pulper is generally between about 4 and 17 weight percent. Defiberization is generally accomplished in about 15 to 60 minutes.

Other chemicals that may be added to the pulper during defiberization include sodium carbonate, sodium phosphate, bleaching agents such as hydrogen peroxide, sodium hydrosulfite and sodium hypochlorite, and sequestering agents such as EDTA (ethylene diamine tetraacetic acid) and DTPA (diethylene triamine pentaacetic acid). A variety of chemical deinking agents are also used to facilitate the separation of the ink particles from the fibers and, in the case of flotation deinking, form ink particulates which may be removed by the flotation process, as distinguished from forming a dispersion of ink particles, as in the washing process. The deinking agents may also be added to the pulper.

The mixture of fibers, ink particles, fillers, etc. produced in the pulper is typically forwarded to a storage tank where it is diluted with water to a consistency of about 2.5 weight percent. This mixture is screened to remove very large contaminants that may be found in the raw waste paper charged to the pulper. The screened pulp mixture may then be forwarded to high density cleaners wherein coarse contaminants not removed in the first screening are removed. The pulp from the high density cleaner is usually diluted further with water to from about 0.5 to about 1 weight percent and screened further to remove additional contaminants.

The paper pulp suspension from the screening and cleaning steps is then subjected to the flotation process to separate the ink particles from the paper pulp suspension. Typically, the consistency of the pulp in the aqueous media subjected to flotation will be between about 0.7 and about 1.5 weight percent, e.g., between about 1 and about 1.25 weight percent (based on the dry weight of the fibers).

The pulp is then delivered to a mixing tank for adding chemicals to the pulp suspension prior to the flotation process or directly to a conventional flotation cell or series of flotation cells for separation of the ink particles by the flotation operation. Suitable flotation cells for this purpose are commercially available, as for example, the apparatus described in U.S. Pat. No. 2,005,742. Flotation equipment for this purpose is manufactured by various manufactures such as Black Clawson, Beloit, Fiberprep/Lamort, Dorr-Oliver, Sankey, Bird Escher Wyss, Denver, and Voith.

The pH of the pulp subjected to flotation will typically be in the alkaline range, e.g., between about 7 and about 10. The temperature of the aqueous media will generally be between about 75° F. (23.9° C.) and about 175° F. (79.4° C.), e.g., about 100° F. (38° C.).

Flotation of the ink particles is achieved by introducing bubbles of air into the flotation cell in the presence of flotation chemicals. The bubbles may be produced by introducing air into the suspension of pulp fibers and ink particles, by saturating the suspension with air using superatmospheric pressure and then releasing the pressure, or by drawing air into the suspension by the action of an agitator in the flotation cell. The bubbles of air in the cell rise to the surface and carry with them ink particles that attach themselves to the air bubbles, thereby causing the ink particles to float to the surface in the form of a foam or froth, which is removed from the flotation cell by skimming, suction or by allowing the froth to overflow the flotation cell into a collection zone, or by other methods known in the art. Separation of the ink particles may be enhanced by the addition of flotation chemicals. The froth from the flotation cell is dewatered, e.g., by the use of thickeners, and the water is recycled back to the paper mill. The ink and fillers comprising the froth are discarded.

The deinked suspension of fibers is removed from the flotation unit, typically passed to further cleaning operations such as screens and filters, and then often subjected to further washing, bleaching, thickening and dewatering before being used as paper stock for the preparation of new paper such as in a paper making machine.

In one embodiment of the present invention, pulping of a mixed office waste is conducted in a batch process at an alkaline pH with a mixture of two washing chemicals; namely, ethoxylated linear alcohols and ethoxylated alkyl phenols, each added to the pulper at a concentration of about 0.2 weight percent based on the weight of the dry fiber. After one hour of agitation in the pulper at a temperature of 120° F. (48.8° C.), the pulp slurry is transferred to a storage tank, diluted and processed through centrifugal cleaners, screens and a washing device. Afterwards, the pulp slurry is rediluted and added to a flotation chemical mix tank prior to the flotation cells. A froth moderating agent, such as an alkoxylated fatty acid ester of sorbitan, at a concentration of 0.05 weight percent, based on the weight of the dry fiber, is added to the chemical mix tank in addition to the commonly used chemical additives package used for flotation deinking, such as that listed in U.S. Pat. No. 4,971,656, column 1, lines 31 to 43. The flotation cell is operated on a continuous basis. The height of the froth is monitored, and if the height of the froth exceeds acceptable levels further addition(s) of the froth moderating agent is made. After deinking by flotation, the pulp slurry is subjected to a series of cleaners, screens, washers and processes to concentrate the pulp prior to its use in a paper machine.

In another embodiment of the present invention, pulping is conducted on a continuous basis, and in addition to the deinking agents specified in the previous embodiment, polypropylene glycol having a number average molecular weight of 500 is added to the pulper at a rate calculated to deliver 0.08 weight percent of the polypropylene glycol, based on the weight of the dry fiber. Further processing is conducted in a manner similar to the previous embodiment, thereby to maintain the froth in the flotation cell at an acceptable height.

In still another embodiment of the present invention, a composition of a displector, such as FLOATSAN™ 109, and a froth moderating agent of formula I at a displector to froth moderating agent ratio of 2:1 is added to the flotation cell at a concentration of 0.3 weight percent, based on the weight of the dry fiber, in place of the commonly used chemical additive package used for flotation deinking listed in U.S. Pat. No. 4,971,656. Further processing is conducted in a manner similar to the previous embodiments, thereby to maintain the froth in the flotation cell at an acceptable height.

The present invention is more particularly described in the following examples which are intended as illustrative only since numerous modifications and variations therein will be apparent to those skilled in the art.

EXAMPLE 1

A one-gallon Maelstrom laboratory pulper made by the Adriondack Machine Company was used to pulp paper samples according to the following procedure: 4070 grams of tap water and 30 grams of a 10 weight percent sodium hydroxide solution were added to the laboratory pulper and heated to about 60° C.; 300 grams of a paper sample was added to the pulper; and pulping was conducted until the paper was completely defibered, which took about 15 minutes. The resulting pulp had a consistency of 6.8 weight percent. 441 grams of the pulp was placed in a large beaker. 2559 grams of hot tap water was added to the beaker resulting in a pulp slurry having a consistency of 1 weight percent and a temperature of about 40° C. The pulp slurry was mixed and transferred into a WEMCO laboratory flotation machine cell tank. The flotation machine was fitted with a WEMCO 1+1® Roto Disperser, which was lowered into the cell tank. The rotation speed of the disperser was set to 1200 revolutions per minute.

Immediately after starting the flotation machine, the treatment chemical(s) listed in Table 1 was added at the concentration, i.e., weight percent based on the weight of the dry fiber, indicated in Tables 2 and 3. When more than one treatment chemical was added, the froth moderating agent of the present invention, i.e., in these examples, treatment chemicals Nos. 2, 3, 4, or 5, was added first and then approximately 30 seconds later the flotation chemical, chemical No. 1, was added. After about 30 seconds of mixing, the air valve was opened to initiate froth formation. A stopwatch was started as soon as the froth began to overflow from the discharge weir of the flotation cell. The froth was removed with a scrapper into a collection pan taking care that only froth was removed. The test was ended after a predetermined flotation time interval or at the froth depletion point, i.e., the point in time at which no more froth was generated. The collected froth was dried and weighed in order to calculate the percent fiber recovered by the following calculations: the amount of fiber in the collected froth was divided by the original amount of fiber added to the flotation cell; this result was multiplied by 100 to obtain the percent fiber lost; the percent fiber lost was subtracted from 100 to obtain the percent fiber recovered.

Handsheets were prepared from the pulp slurry in the cell tank following TAPPI Method T-205 om-88, which was modified by including a step for pressing the handsheets for reflectance testing, and were examined for percent brightness in accordance with TAPPI Method T-452. The level of froth that formed in the cell tank was described as a large amount (+++), a medium amount (++), a small amount (+), or an amount that overlapped these levels, e.g., (+→++). The froth produced in the sample treated with the flotation deinking chemical, e.g., Treatment Chemical No. 1, was found to be stable, i.e., the froth persisted for a few minutes after collection. The stability of the froth in the untreated samples and the samples treated with the froth moderating agent of the present invention in combination with a flotation deinking chemical was evaluated on a comparative basis with the sample treated with the flotation deinking chemical alone. For example, if the froth from the samples treated with the froth moderating agent of the present invention in addition to the flotation deinking chemical settled in less time than the sample treated with the flotation deinking chemical alone it was rated as unstable (−) and if the froth took the same amount of time or more time to settle as compared to the sample treated with the flotation deinking chemical alone, it was rated as stable (+). Results for testing conducted on pulp collected from one paper mill is listed in Table 2 and results for testing of pulp collected and combined from two different paper mills is listed in Table 3.

TABLE 1

TREATMENT CHEMICALS

| | |
|---|---|
| 1. | FLOATSAN ™ 109 - an alkoxylated fatty acid glyceride ester, available from PPG Industries, Inc. |
| 2. | Sorbitan monooleate |
| 3. | Sorbitan trioleate |
| 4. | Octyl phenol alkoxylated with 3 moles of ethylene oxide and chloro capped |
| 5. | Polypropylene glycol having a number average molecular weight of 500 |

TABLE 2

| Treatment Chemical (Conc.- Wt. %) | Flotation Time (Min.) | % Fiber Recovered | Handsheet Brightness | Amt. of Froth | Stability of Froth |
|---|---|---|---|---|---|
| None | 3 | 87.44 | 62.28 | ++→+++ | − |
| No. 1 (0.1%) | 3 | 82.25 | 63.10 | +++ | + |
| No. 1 (0.1%) and No. 2 (0.05%) | 3 | 92.36 | 62.43 | +→++ | − |
| No. 1 (0.1%) and No. 3 (0.05%) | 3 | 91.68 | 64.40 | ++ | − |

TABLE 3

| Treatment Chemical (Conc.- Wt. %) | Flotation Time (Min.) | % Fiber Recovered | Handsheet Brightness | Amt. of Froth | Stability of Froth |
|---|---|---|---|---|---|
| None | 3 | 86.2 | 55.20 | ++→+++ | + |
| No. 1 (0.1%) | 3 | 84.5 | 56.57 | +++ | + |
| No. 1 (0.1%) | 2 | 85.70 | 56.21 | +++ | + |
| No. 1 (0.1%) and No. 2 (0.025%) | 2.5 | 87.04 | 56.50 | ++ | − |
| No. 1 (0.1%) and No. 4 (0.05%) | 2.5 | 89.53 | 55.58 | ++ | − |
| No. 1 (0.1%) and No. 4 (0.025%) | 2.5 | 88.3 | 55.76 | +++ | − |

The data reported in Table 2 indicate that the separate additions of froth moderating chemicals Nos. 2 and 3, compared to treatment chemical No. 1, resulted in a higher percent fiber recovered, the formation of a lower amount of a less stable froth, and a comparable handsheet brightness, as compared to the untreated control and the pulp treated with chemical No. 1 alone. The data reported in Table 3 indicate that the separate additions of froth moderating chemicals Nos. 2 and 4, compared to treatment chemical No. 1, showed similar results to those demonstrated in Table 2 for treatment chemicals Nos. 2 and 3.

EXAMPLE 2

The laboratory pulper of Example 1 was used to pulp paper samples according to the following procedure: 4110 grams of deionized water and 26.4 grams of a 10 weight percent sodium hydroxide solution were added to the laboratory pulper and heated to 60° C.; 264 grams of a paper sample prepared from Paper A, Paper B, or Paper C, as described in Table 4, was added to the pulper; and pulping was conducted until the paper was completely defibered, which took about 15 minutes. The resulting pulp had a consistency of 6 weight percent. Prior to testing in the defoamer cell, 500 grams of pulp and the treatment chemicals were placed in a blender and mixed for 2 minutes. Treated samples prepared in this manner were designated in Tables 5, 6, and 7 as having the treatment chemicals "Added During Pulping". The sample was diluted to a consistency of 1 weight percent with deionized water and stirred for 1 minute at 600 revolutions per minute using a motorized stirrer. Treated samples designated as having the treatment chemicals "Added After Pulping" were prepared by adding the froth moderating agent of the present invention, i.e., in this example, treatment chemicals No. 2 and 5, to the diluted pulp prior to mixing with the motorized stirrer. The resulting pulp slurry was filtered to remove the fibers and the remaining solution was tested in the froth test cell.

The froth test cell consisted of a transparent cylinder of uniform diameter. The cylinder was graduated in centimeters, was open at the top, and had a small opening at the bottom. The bottom opening was connected by tubing to a pump, the discharge end of which was connected by tubing, the end of which was positioned near the rim of the top of the cyclinder. Fluid pumped through the tubing was discharged into the top opening of a smaller coaxial cylinder of uniform diameter positioned about 2.5 centimeters below the top of the transparent larger cylinder. The dimensions of the smaller cylinder were about one fourth the diameter and two thirds the height of the larger cylinder. The bottom of the smaller cylinder discharged into a test tube-like cylinder, the dimensions of which were three quarters the diameter and one third the height of the larger transparent cylinder. The bottom of the test tube was positioned about 2.5 centimeters below the discharge end of the smaller cylinder and was perforated with four (4) holes, each having a diameter of about 0.3 centimeters, to allow the fluid and froth in the test tube to flow into the larger cylinder.

Solutions prepared from each pulped paper sample were added to the froth test cell to the 11.0 centimeter mark and the pump was turned on for 5 seconds. This was done to circulate the fluid, fill the connecting lines, and determine the height of the air liquid interface which was 4.5 centimeters from the bottom of the cylinder. Afterwards, the pump was turned on and the froth build-up in centimeters was recorded every 15 seconds for 1 minute. The height of the froth build-up included the liquid level of 4.5 centimeters. After the pump was turned off, the froth breakdown was followed by recording the froth height in centimeters after selected intervals up to 5 minutes. The results of the froth height in centimeters for tests performed on Paper Samples A, B, and C are listed in Tables 5, 6, and 7, respectively.

TABLE 4

| Paper Sample | Description |
|---|---|
| A | Mead Paper Trans/rite CFB (carbonless on front and back) 50% pink, 50% yellow, basis weight 14 lbs. |
| B | Willamette Industries, Inc., Willcopy ® White Bond, basis weight 20 lbs. |
| C | New Yorker Magazine which was shredded. |

TABLE 5

| Time Interval | Untreated Control | No. 1* (0.05%) | No. 1* (0.05%) and No. 2* (0.025%) Added During Pulping | No. 1* (0.05%) and No. 2* (0.025%) Added After Pulping |
|---|---|---|---|---|
| Froth Build-Up: Froth Height Measured in Centimeters ||||| 
| 15 Sec. | 18 | 17 | 16 | 15.5 |
| 30 Sec. | 19 | 17 | 17.5 | 17.5 |
| 45 Sec. | 19.5 | 18 | 18 | 18.5 |
| 60 Sec. | 21.5 | 19 | 17.5 | 18.5 |
| Froth Breakdown: Froth Height Measured in Centimeters ||||| 
| 10 Sec. | 18 | 19 | 17 | 18 |
| 20 Sec. | 16 | 17.5 | 13 | 13.5 |
| 30 Sec. | 14.5 | 12 | 13 | 13.5 |
| 60 Sec. | 14 | 11.75 | 12 | 12.75 |
| 120 Sec. | 13.5 | 11.5 | 11.75 | 12 |
| 180 Sec. | 13.5 | 11.5 | 11.75 | 11.75 |
| 240 Sec. | 13.25 | 11.5 | 11.5 | 11.75 |
| 300 Sec. | 13.25 | 11.5 | 11.5 | 11.75 |

*Treatment Chemicals as listed in Table 1 which were added in the amounts, e.g., (0.05%), indicated as a weight percent based on the weight of the dry pulp fiber.

Results in Table 5 for Paper Sample A show a decrease in the froth build-up and a faster froth breakdown of the treated samples as compared with the untreated control. The samples treated with chemicals Nos. 1 and 2, which were added both during pulping and after pulping, as compared to the sample treated with only chemical No. 1, showed less froth build-up during the entire test and a faster froth breakdown in the first 20 seconds of the test.

TABLE 6

| Time Interval | Untreated Control | No. 1* (0.05%) | No. 1* (0.25%) and No. 2* (0.1%) Added During Pulping | No. 1* (0.2%) and No. 2* (0.1%) Added After Pulping |
|---|---|---|---|---|
| Froth Build-Up: Froth Height Measured in Centimeters ||||| 
| 15 Sec. | — | 14 | 8.5 | 7 |
| 30 Sec. | — | 16.5 | 11 | 11 |
| 45 Sec. | — | 17 | 12.5 | 15 |
| 60 Sec. | — | 17.5 | 16.5 | 17 |
| Froth Breakdown: Froth Height Measured in Centimeters ||||| 
| 10 Sec. | — | 16.5 | 16 | 17 |
| 20 Sec. | — | 14.5 | 12 | 12.5 |
| 30 Sec. | — | 14 | 12 | 12.5 |
| 60 Sec. | — | 12.25 | 11.75 | 12.5 |
| 120 Sec. | — | 12 | 11.5 | 12 |
| 180 Sec. | — | 11.75 | 11.5 | 12 |
| 240 Sec. | — | 11.5 | 11.5 | 11.75 |
| 300 Sec. | — | 11.5 | 11.5 | 11.5 |

*Treatment Chemicals as listed in Table 1 which were added in the amounts, e.g., (0.05%), indicated as a weight percent based on the weight of the dry pulp fiber.

The untreated control of Paper Sample B produced no measurable froth in the froth test. Both samples treated with the combination of chemicals Nos. 1 and 2 showed less froth build-up than the sample treated with chemical No. 1 alone. Regarding froth breakdown, the sample treated with chemicals Nos. 1 and 2, added during pulping, demonstrated a faster froth breakdown, up to 180 seconds, than the other 2 treated samples.

TABLE 7

| | Untreated Control | Chemical No. 1* (0.15%) | No. 1* (0.15%) & No. 2* (0.075%) | No. 1* (0.15%) & No. 2* (0.075%) Added After Pulping | No. 1* (0.15%) & No. 5* (0.075%) Added During Pulping |
|---|---|---|---|---|---|
| Froth Build-Up: Froth Height Measured in Centimeters | | | | | |
| 15 Sec. | 11 | 13 | 11.5 | 12 | 11.5 |
| 30 Sec. | 14 | 18.5 | 17 | 17.5 | 17 |
| 45 Sec. | 18 | 21 | 20 | 20 | 20.5 |
| 60 Sec. | 19 | 24 | 22 | 22.5 | 21 |
| Froth Breakdown: Froth Height Measured in Centimeters | | | | | |
| 10 Sec. | 20.5 | 26 | 24.5 | 25 | 23 |
| 20 Sec. | 19 | 25.5 | 23 | 24 | 22.5 |
| 30 Sec. | 17.5 | 24.5 | 22.5 | 23 | 22.5 |
| 60 Sec. | 17 | 22 | 20 | 21 | 20.5 |
| 120 Sec. | 16 | 18 | 18 | 17.5 | 17.5 |
| 180 Sec. | 14.5 | 16 | 17 | 16 | 15 |
| 240 Sec. | 13.5 | 15 | 15.5 | 15 | 14.5 |
| 300 Sec. | 13 | 14.5 | 14.5 | 14.5 | 14 |

*Treatment Chemicals as listed in Table 1 which were added in the amounts, e.g., (0.05%), indicated as a weight percent based on the weight of the dry pulp fiber.

The untreated control sample of Paper C demonstrated less froth build-up than all of the treated samples. Samples treated with chemicals Nos. 1 and 2 and 1 and 5 respectively, showed less froth build-up than the sample treated with chemical No. 1 alone. These samples also demonstrated a faster froth breakdown, up to 120 seconds, than the sample treated with chemical No. 1 alone.

EXAMPLE 3

The procedure of Example 1 for preparing and treating the secondary fiber and for preparing hand sheets was followed except that the waste paper sample consisted of 285 grams of paper from a different paper mill, 7.5 grams of AVERY labels, and 7.5 grams of 3M Post-it correction tape. The treatment chemicals used were No. 1 and a combination of Nos. 1 and 4. The resulting handsheets were evaluated for a dirt count, i.e., ink and stickie particulates, using the camera-based Quantimet 520 by Leica, Inc., a computerized image analysis system. Prior to testing, the image analyzer was calibrated to the TAPPI Dirt Estimation Chart in TAPPI Methods T-213 and T-417. An area of 4 by 4 inches (100 by 100 millimeters) on both sides of the handsheets was scanned to generate the TAPPI Dirt Count, i.e., the number of particles having a surface area greater than 0.04 millimeter square, and the Total Dirt Count, i.e., the number of particles included in the TAPPI Dirt Count and those having a surface area less than 0.04 millimeter square. The results are listed in Table 8.

TABLE 8

| Treatment Chemical (Conc.- Wt. %) | Flotation Time (Min.) | Total Dirt Count | TAPPI Dirt Count | % Fiber Recovered |
|---|---|---|---|---|
| No. 1* (0.1%) | 2 | 1717.22 | 1613.13 | 79.61 |
| No. 1* (0.1%) and No. 4* (0.05%) | 2 | 1127.04 | 1051.03 | 78.27 |

*Treatment Chemicals as listed in Table 1 which were added in the amounts, e.g., (0.05%), indicated as a weight percent based on the weight of the dry pulp fiber.

The results in Table 8 show a reduction of about 34 percent in the Total Dirt Count and the TAPPI Dirt Count for the sample treated with chemicals Nos. 1 and 4 as compared with the sample treated with chemical No. 1 alone. The results for percent fiber recovered for the sample treated with chemicals Nos. 1 and 4 was essentially the same, i.e., the results are within the range of accuracy of the measurement methods used, as the sample treated with chemical No. 1 alone.

EXAMPLE 4

The procedure of Example 3 was followed except that Paper Sample B described in Table 4 was used in place of the waste paper and the handsheets were processed using a procedure to visualize the "stickies", i.e., to make the "stickies" appear as white or translucent spots on a handsheet dyed black for reverse image analysis, since Paper Sample B did not contain printing ink.

The following procedure was used to visualize the "stickies": each handsheet was placed between two paper filters of comparable size and pressed with an electric iron having a heated surface of about 180° C. for about 25 seconds; each pressed handsheet was immersed for a few seconds in a 25 weight percent aqueous solution of CARTER'S black stamp pad ink in deionized water; the excess ink on the handsheet was removed by placing the dyed handsheet between blotting paper and applying pressure, and the blotted handsheet dried for about 10 minutes at about 120° C. in a William's sheet dryer. The resulting handsheets were evaluated for a "stickie" count using the camera-based Quantimet 520 by Leica, Inc., a computerized image analysis system, using the procedure for a dirt count described in Example 3. The results are listed in Table 9.

TABLE 9

| Treatment Chemical (Conc. - Wt. %) | Flotation Time (Min.) | Total "Stickie" Count | TAPPI "Stickie" Count | % Fiber Recovered |
|---|---|---|---|---|
| No. 1* (0.2%) | 3 | 3009 | 2990 | 88.2 |
| No. 1* (0.2%) and No. 4* (0.05%) | 2.5** | 561 | 543 | 85.9 |

*Treatment Chemicals as listed in Table 1 which were added in the amounts, e.g., (0.05%), indicated as a weight percent based on the weight of the dry pulp fiber.
**Froth Depletion Point The results in Table 9 show a reduction of about 81 percent in the Total "Stickie" Count and the TAPPI "Stickie" Count for the sample treated with chemicals Nos. 1 and 4 as compared with the sample treated with chemical No. 1 alone. The decrease in the percent fiber recovered for the sample treated with chemicals Nos. 1 and 4 was probably due to a carryover of fiber with the stickies that were removed.

The present invention has been described with reference to specific details of certain embodiments thereof, however, it is not intended that such details should be regarded as limitations upon the scope of the invention, except insofar as they are included in the accompanying claims.

What is claimed is:

1. In the method for deinking secondary fiber wherein:
   (a) an aqueous slurry of secondary fiber is produced from waste paper,
   (b) the aqueous slurry of secondary fiber is treated with chemical deinking agents, thereby to form an aqueous slurry comprising ink particulates and secondary fiber, and
   (c) the ink particulates are separated from the secondary fiber by a flotation step process that includes a flotation step wherein a froth is formed, the improvement comprising performing said flotation step in the presence of a froth controlling amount of a froth moderating agent selected from the group consisting of:

(i) nonionic surfactant material represented by the formula:

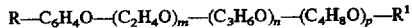

wherein R is an aliphatic hydrocarbon group containing from about 5 to 20 carbon atoms, $R^1$ is selected from the group consisting of chloro, $C_1$–$C_3$ alkyl, $C_1$–$C_5$ alkoxy and phenoxy, m, n, and p are each a number of between 0 and about 50, and the sum of m, n, and p is between about 1 and 50;

(ii) fatty acid esters of sorbitan;

(iii) alkoxylated fatty acid esters of sorbitan having a total of up to 50 alkoxy groups selected from the group consisting of ethylenoxy and propylenoxy groups; ethylenoxy and butylenoxy groups; ethylenoxy, propylenoxy, and butylenoxy groups; propylenoxy groups; butylenoxy groups; and propylenoxy and butylenoxy groups, provided that the numerical ratio of ethylenoxy groups, when present, to the total number of other alkylenoxy groups is less than 1;

(iv) polypropylene glycol that is at least 50 percent soluble in water under the conditions of flotation deinking use; and (v) a combination of at least two of such nonionic surfactant materials.

2. The method of claim 1 wherein the letters m, n, and p are each a number of between 0 and about 30, and the sum of m, n, and p is between about 1 and 30; and said fatty acid esters of sorbitan are selected from the group consisting of sorbitan monooleates, sorbitan trioleates, sorbitan monostearates, sorbitan tristearates, and mixtures thereof.

3. The method of claim 2 wherein the aliphatic hydrocarbon group R contains from about 8 to 10 carbon atoms, $R^1$ is chloro, m, n, and p are each a number between 0 and about 10, and the sum of m, n, and p is between about 1 and 10; and the fatty acid esters of sorbitan are selected from the group consisting of sorbitan monooleates, sorbitan trioleates, and mixtures thereof.

4. The method of claim 1 wherein the froth controlling amount is from about 0.005 to about 5.0 weight percent, based on the weight of the dry pulp fiber.

5. The method of claim 4 wherein the froth controlling amount is from about 0.01 to about 3.0 weight percent, based on the weight of the dry pulp fiber.

6. In the method for deinking secondary fiber wherein:

(a) an aqueous slurry of secondary fiber is produced from waste paper, (b) the aqueous slurry of secondary fiber is treated with chemical deinking agents, thereby to form an aqueous slurry comprising ink particulates and secondary fiber, and (c) the ink particulates are separated from the secondary fiber by a process that includes a flotation step wherein froth is formed, the improvement comprising performing said flotation step in the presence of a combination of flotation deinking chemicals and a froth controlling amount of a froth moderating agent selected from the group consisting of:

(a) a nonionic surfactant material represented by the formula:

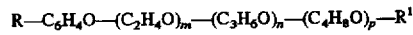

wherein R is an aliphatic hydrocarbon group containing from about 5 to 20 carbon atoms, $R^1$ is selected from the group consisting of chloro, $C_1$–$C_3$ alkyl, $C_1$–$C_5$ alkoxy, and phenoxy, m, n, and p are each a number of between 0 and about 50° and the sum of m, n, and p is between about 1 and 50:

(b) fatty acid esters of sorbitan:

(c) alkoxylated fatty acid esters of sorbitan having a total of up to 50 alkoxy groups selected from the group consisting of ethylenoxy, propylenoxy groups: ethylenoxy and butylenoxy groups; ethylenoxy, propylenoxy and butylenoxy groups; propylenoxy groups; butylenoxy groups; and propylenoxy and butylenoxy groups, provided that the ratio of ethylenoxy groups, when present, to the total number of other alkylenoxy groups is less than 1;

(d) polypropylene glycol that is at least 50 weight percent soluble in water under the conditions of use; and (e) a combination of at least two of such nonionic materials.

7. The method of claim 6 wherein said flotation deinking chemicals are displectors or a combination of frothers and collectors; the letters m, n, and p are each a number of between 0 and about 30, and the sum of m, n, and p is between about 1 and 30; and said fatty acid esters of sorbitan are selected from the group consisting of sorbitan monoleates, sorbitan trioleates, sorbitan monostearates, sorbitan tristearates, and mixtures thereof.

8. The method of claim 7 wherein said flotation deinking chemicals are displectors; the aliphatic hydrocarbon group R contains from about 8 to 10 carbon atoms, $R^1$ is chloro, m, n, and p are each a number between 0 and about 10, and the sum of m, n, and p is between about 1 and 10; and the fatty acid esters of sorbitan are selected from the group consisting of sorbitan monooleates, sorbitan trioleates, and mixtures thereof.

9. In the method for deinking secondary fiber containing stickies wherein:

(a) an aqueous slurry of secondary fiber containing stickies is produced from waste paper, (b) the aqueous slurry of secondary fiber is treated with chemical deinking agents, thereby to form an aqueous slurry comprising ink particulates, stickies and secondary fiber, and (c) the ink particulates and stickies are separated from the secondary fiber by a process that includes a flotation step wherein froth is formed, the improvement comprising performing said flotation step in the presence of a froth controlling amount of a froth moderating nonionic surfactant material represented by the formula:

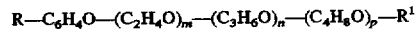

wherein R is an aliphatic hydrocarbon group containing from about 5 to 20 carbon atoms, $R^1$ is selected from the group consisting of chloro, $C_1$–$C_3$ alkyl, $C_1$–$C_5$ alkoxy and phenoxy, m, n, and p are each a number of between 0 and about 50, and the sum of m, n, and p is between about 1 and 50, thereby to control the amount of froth formed and reduce the amount of stickies in the separated fiber.

10. The method of claim 9 wherein the letters m, n, and p are each a number of between 0 and about 30, and the sum of m, n, and p is a number between about 1 and 30.

11. The method of claim 10 wherein the aliphatic hydrocarbon group R contains from about 8 to 10 carbon atoms, $R^1$ is chloro, m, n, and p are each a number between 0 and about 10, and the sum of m, n, and p is between about 1 and 10.

12. The method of claim 11 wherein the froth controlling amount is from about 0.01 to about 3.0 weight percent, based on the weight of the dry pulp fiber.

13. The method of claim 9 wherein the froth controlling amount is from about 0.005 to about 5.0 weight percent, based on the weight of the dry pulp fiber.

14. In the method for deinking secondary fiber containing stickies wherein:

(a) an aqueous slurry of secondary fiber containing stickies is produced from waste paper, (b) the aqueous slurry of secondary fiber is treated with chemical deinking agents thereby to form an aqueous slurry comprising ink particulates, stickies and secondary fiber, and (c) the ink particulates and stickies are separated from the secondary fiber by a process that includes a flotation step wherein froth is formed, the improvement comprising performing said flotation step in the presence of a froth controlling amount of a composition comprising a combination of flotation deinking chemicals and a froth moderating nonionic surfactant material represented by the formula:

$$R-C_6H_4O-(C_2H_4O)_m-(C_3H_6O)_n-(C_4H_8O)_p-R^1$$

wherein R is an aliphatic hydrocarbon group containing from about 5 to 20 carbon atoms, $R^1$ is selected from the group consisting of chloro, $C_1-C_3$ alkyl, $C_1-C_5$ alkoxy and phenoxy, m, n, and p are each a number of between 0 and about 50, and the sum of m, n, and p is between about 1 and 50, thereby to control the amount of froth formed and reduce the amount of stickies in the separated fiber.

15. The method of claim 14 wherein said flotation deinking chemicals are displectors; R is an aliphatic hydrocarbon group containing from about 8 to 10 carbon atoms, $R^1$ is chloro, m, n, and p are each a number between 0 and about 10, and the sum of m, n, and p is between about 1 and 10.

* * * * *